Jan. 3, 1956  G. F. WALES  2,729,440
FORCE ADJUSTMENT FOR FLUID SPRING
Filed May 25, 1951

INVENTOR.
George F. Wales
BY Edwin B. Gary
Attorney.

United States Patent Office 2,729,440
Patented Jan. 3, 1956

2,729,440
FORCE ADJUSTMENT FOR FLUID SPRING

George F. Wales, Kenmore, N. Y.

Application May 25, 1951, Serial No. 228,245

6 Claims. (Cl. 267—1)

This invention relates to a device characterized by a body of fluid which is compressible, in response to forces of compression, either to provide a desired resilient or cushioning action or to store energy which may be released to perform work when the forces of compression are relieved.

A device of the general type described is disclosed in the co-pending application of Paul H. Taylor, Serial No. 180,966, filed August 23, 1950, now Patent No. 2,708,109, granted May 10, 1955. Such a device, also referred to as a "fluid spring," has the advantage that it is compact in design and is capable of carrying loads and storing energy far beyond the capactiy of conventional metal springs of comparable size.

The device of the invention is characterized by features which enable it to be readily associated with various kinds of instrumentalities. Highly beneficial results may be obtained when the device is associated with instrumentalities in which the space available is limited or in connection with instrumentalities wherein the forces to be stored and released are substantial. The device of the invention may, for example, be employed in connection with blanking apparatus of the kind disclosed in my Patents 1,811,987 of June 30, 1931, and 2,324,657 of July 20, 1943, the device in such cases being employed as a substitute for the mechanical spring units therein illustrated for providing the forces required for stripping purposes. The forces which are released for stripping purposes are developed by the ram of the press incident to the operation of the blanking elements and are released as the ram of the press returns to a retracted position upon completion of such operation.

As illustrated in the patents above noted, it has been the usual practice to employ mechanical springs for developing the forces required for stripping purposes. The use of mechanical springs has, however, imposed highly objectionable limitations with respect to the thickness and character of the material which may be blanked as the availability of the apparatus for the purpose contemplated is, of necessity, dependent upon the forces available for actuating the stripping apparatus. Because of this limitation, it has been impractical heretofore to blank out and perforate thick stock; and it has not been practical to overcome the objection noted by the use of large springs because in the larger diameters a given wire size of spring provides a soft spring which possesses insufficient stripping capacity unless preloaded to a substantial degree. Pre-loading of itself is objectionable as it imposes severe stresses on the blanking and stripping apparatus.

The use of mechanical springs for stripping and other purposes has other serious objections, a serious one being that such springs require considerable space and hence increase substantially the overall dimensions of the apparatus. Such springs have the further objection that they are subject to fatigue and breakage, particularly if compressed to such an extent that the various convolutions bottom upon one another.

The invention contemplates the use of a fluid medium, preferably an oil or other suitable liquid, which may be compressed and reduced in volume during the working stroke of a work-performing instrumentality, whereby to store energy in said medium which may be released to perform work by permitting the fluid medium to expand upon completion of the working stroke of the instrumentality. The invention also contemplates the use of such a fluid medium solely for shock absorbing purposes, also as a means for applying yielding pressures to various elements and machine parts. The use of oil as the compressible fluid for the various purposes specifically referred to above, and for other purposes, has the advantage that the oil may be subjected, for example, to a pressure of 50,000 p. s. i., while the volume of the oil is being reduced approximately 13%, although the volume of silicone and other oils may be reduced as much as 26% by the same pressure. As the maximum permissible force for compressing a mechanical coil spring will not, considering its volume, ordinarily exceed 1,000 p. s. i., it will be readily appreciated that the resilient means of the invention is available to provide stripping and other work-performing forces, within the same space, far exceeding any such forces as can be obtained with the use of a mechanical spring. Although for various reasons, such as the need for operating at lower pressures because of seal considerations, the gain ratio may not be as high as 50 to 1, an overall gain of some 8 or 10 to 1 can be readily attained. In other words, it is possible by using a fluid medium in the manner contemplated to readily develop stripping forces 800% to 1,000% greater than can be developed by a mechanical spring within the same space limitations.

An object of the present invention, therefore, is to provide a device of the character generally described which may be availed of to absorb energy or store and release high work-performing forces and which may be accommodated in a minimum of space.

A further object is to provide a device wherein the compressible fluid may be pre-loaded in varying degrees in order to insure optimum performance of the device in the particular environment in which it is used.

Another object is to provide a device characterized by an element which is movable in response to forces of compression to compress a compressible fluid and wherein pre-loading of the compressible fluid may be varied to obtain the desired end load (stored work-performing energy, for example) with a predetermined travel of said element.

A further object is to provide a device which may be readily adjusted to compensate for leakage of the compressible fluid.

A still further object is to provide a device which is so designed that the compressible fluid may be introduced into the device with facility and without trapping of air incident to the filling operation.

A still further object is to provide a device which is so designed that escape of the compressible fluid by leakage will be minimized.

A still further object is a novel design and arrangement of the parts of the device, whereby to provide for simplicity and economy in construction, insure dependability in operation and enable the accommodation of a maximum volume of fluid within a minimum of space.

The invention is illustrated in the accompanying drawing, wherein

Figure 1:
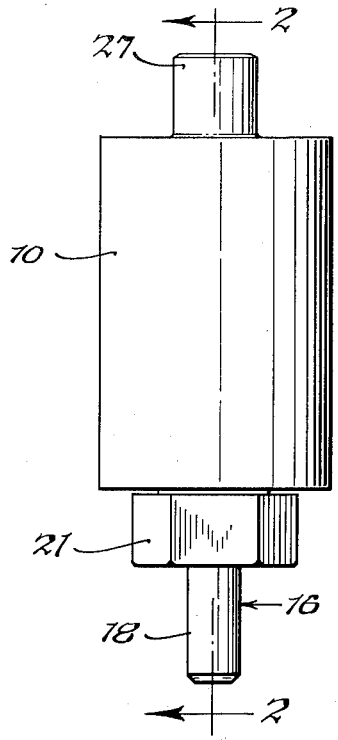
Figure 1 is a side elevational view of a device embodying the features of the invention.
Figure 2:
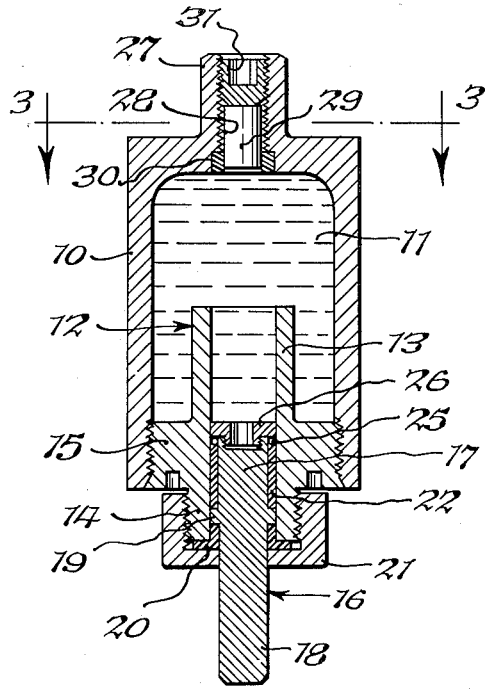
Figure 2 is a vertical section through the device and is taken along line 2—2 of Figure 1.

The device, as illustrated, includes a housing 10 which may be cylindrical, as shown, or of any other desired shape and which provides a container for a body of compressible fluid 11. The latter may be any suitable compressible fluid, although it is preferably an oil such as silicone oil, for example. A cylinder 12 has an inner end 13 which extends into the chamber occupied by the fluid 11 and an outer threaded end 14. Intermediate its inner and outer ends, the cylinder 12 is formed with an annular flange 15 which threadedly engages the internally-threaded, open end of the housing 10.

The cylinder 12 accommodates a piston 16, the latter having a head portion 17 and a shaft portion 18. Outward movement of the piston 16 is limited by a shoulder 19 provided by the lower end of the head portion of the piston and the inner end of a sealing ring 20. The latter has a sleeve portion through which the shaft portion of the piston extends and a flange portion which is compressed between the threaded end of the cylinder and a cap-piece 21.

Figures 3, 5:
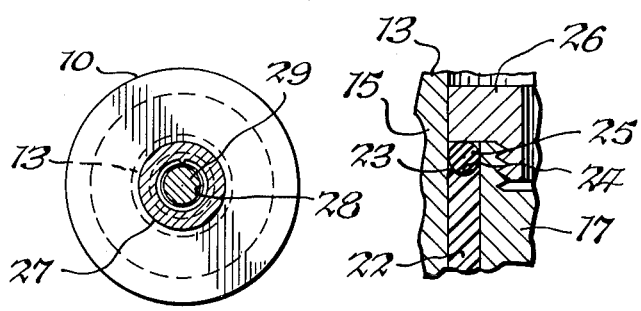
Figure 3 is a transverse section taken along line 3—3 of Figure 2.
Figure 5 is an enlarged detailed section illustrating the manner in which the compressible fluid is prevented from escaping between the piston to which the forces of compression are applied and the cylinder in which the piston is movable.

Preferably the head portion of the piston is sheathed in a nylon sleeve 22, the upper end 23 (Figure 5) of the sleeve being formed with an arcuate seat 24 for accommodating an O-ring 25. The latter is prevented from moving off the seat 24 by the flange of a threaded element 26, the periphery of said flange preferably being slightly spaced from the cylinder wall. The O-ring responds to the pressure of the fluid 11 in the housing 10 and is operative to pre-load and expand the upper end of the sleeve 22 to provide a tight seal which will reduce to a minimum any leakage of fluid between the piston and the cylinder, although the element 26 may be tightened upon the O-ring 25 for the same purpose, if desired.

It will be noted that the inner end 13 of the cylinder is of such a diameter that the wall thereof is spaced from the inner walls of the housing 10. The wall of the inner end of the cylinder may, therefore, be so designed that the forces tending to expand said wall may be balanced by the forces tending to collapse it. Effective sealing of the fluid 11 in the housing 10 may, therefore, be attained and maintained over long periods of use, even with the high fluid pressures contemplated. In this connection, it is to be understood that, if desired, the wall of the cylinder portion 13 may be so designed that it will be deflectable in response to the fluid pressures developed in the housing 10 to close any clearance between the piston and cylinder to establish a seal independently of that provided by the nylon sleeve and O-ring. Establishing and maintaining a seal between a piston and the cylinder in which the piston is operable by compressing the cylinder around the piston is disclosed and claimed in the co-pending application of Paul H. Taylor, Serial No. 180,966, filed August 23, 1950, referred to heretofore.

At its upper end, the housing 10 is formed with a neck 27. A bore 28 through the latter provides a passage through which the compressible fluid may be introduced into the housing.

In accordance with the invention, the bore 28 accommodates a piston-like fluid-displacement element 29 which is adjustable axially of the bore 28 and in a sealing ring 30 which is arranged in an enlargement at the lower end of the bore. A threaded plug 31 which occupies the bore 28 is engageable with the outer end of the displacement element 29 and is adjustable in the bore 28 to vary the position of the displacement element. Assuming the housing 10 to be filled with the compressible fluid, as it normally will be, it will be apparent that any movement of the displacement element 29 into the housing will compress the fluid medium while a withdrawal movement of the displacement element, assuming the fluid medium to be under pressure, will permit reduction of such pressure. The displacement element 29 is, therefore, adjustable to pre-load the device so that the desired end load may be developed with a predetermined piston stroke. The displacement element 29 is thus available to enable variation, at will, of the pre-load, end load and stroke of the device. As a result, the device may be adjusted to insure optimum performance in the particular environment or under the particular conditions in which it is used. The displacement element 29 may also be adjusted to compensate for any leakage which may occur.

The displacement element 29 may be availed of as the sole means for pre-loading the compressible fluid to the extent desired. However, if the desired pre-loading cannot be obtained by the displacement element 29, such pre-loading may be obtained by the conjoint use of the displacement element 29 and the piston 16. In this connection, it will be apparent that if the cap-piece 21 is screwed only part-way on the threaded extension of the cylinder 12, the housing 10 then filled with the compressible fluid and the displacement element 29 and plug 31 inserted in the bore 28 in their initial positions of adjustment, the cap-piece 21 may be screwed home to move the piston 16 into the cylinder 12 to compress the body of fluid 11, the amount of such compression depending upon the displacement of the piston and to the extent to which it is so moved. After such initial pre-loading, the threaded plug 31 may be turned to move the displacement element 29 into the bore 28 to increase the pre-load until the desired value is obtained.

Preferably the sealing rings 20 and 30, in addition to the sleeve 22, are of nylon as it has been found that such material not only provides a good seal but also provides a good bearing surface which is not adversely affected by various fluids which may not possess the desired lubricating properties.

Figure 4:
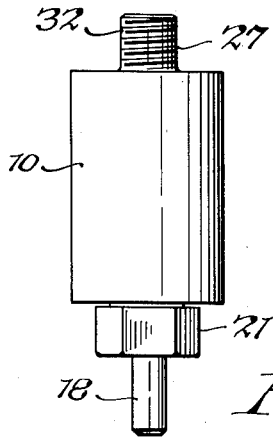
Figure 4 is a view similar to Figure 1 of a modified form of device.

In the embodiment of the invention illustrated in Figure 4, the neck 27 of the housing 10 is externally threaded as indicated at 32 so that the device may be readily attached to the apparatus with which it is associated. In other respects the device is similar to that illustrated in Figures 1, 2, 3 and 5.

From the foregoing, it will be apparent that the device may be employed in the same manner as a mechanical spring, although possessing many characteristics far superior to those of such a spring. In the use of the device, any compression forces which act upon the housing 10 and the piston 16 compress the fluid medium 11 and upon the release of the compression forces, the compressed fluid will expand to restore the piston 16 to its normal position. The device may be available to absorb, store and release energy, provide means for applying yielding pressure to an element or machine part and in various other applications requiring the use of a compressible resilient means.

It will be apparent, therefore, that the specific uses mentioned herein are intended by way of example only and that the device of the invention may be employed to advantage for various other purposes.

I claim as my invention:

1. A device of the character described comprising a housing formed to provide a chamber filled with a body of compressible liquid and one end of which is formed with a threaded opening, a cylinder screwed into said opening and open at one end into said chamber, said cylinder having an external threaded extension, a piston movable in said cylinder in response to compression forces to compress said body of liquid, said piston being returned to its original position as said body of liquid is permitted to expand upon relief of said compression forces, a cap-piece screwed on said threaded extension and operatively connected to said piston to adjust the original position of said piston, said cap-piece and piston being adjustable relative to said threaded extension to pre-load said body of liquid, and a displacement element movable into said chamber for further pre-loading said body of liquid.

2. A device of the character described comprising a housing having a chamber filled with a compressible liquid and which has openings in it at opposite ends, a cylinder screwed into one of said openings, the other opening serving for introduction of the liquid into said chamber, said cylinder communicating at one end with said chamber and having a threaded extension at its opposite end external of said housing, a piston movable inwardly in said cylinder in response to compression forces to compress said liquid, said piston being returned to its original, outer position as said liquid expands upon relief of said compression forces, a seal disposed between said cylinder and said piston for preventing leakage of the liquid along said piston, a cap-piece screwed on said threaded extension for limiting outward movement of said piston, said cap-piece and piston being operable to pre-load said liquid, a displacement element movable axially in said other opening, means for closing said other opening and for effecting axial adjustment of said displacement element in said other opening for further pre-loading said liquid, said housing being formed with a seat around said other opening at the inner end thereof, and a seal positioned on said seat for preventing leakage of the liquid along said displacement member, the first-named opening being larger in diameter than the last-named seal whereby said last-named seal may be introduced into its seat through said first-named opening before said cylinder has been threaded into said first-named opening.

3. A device of the character described comprising a housing having a chamber formed therein, a cylinder communicating with said chamber, and a cylindrical bore communicating with said chamber at a point spaced from said cylinder, said chamber, cylinder, and bore being filled with a body of compressible liquid, a piston reciprocable in said cylinder and having liquid-tight engagement therewith, said piston being movable in one direction in said cylinder in response to compression forces to compress said body of liquid, said piston being moved in the opposite direction to its original position when said liquid is permitted to expand upon relief of said compression forces, means limiting movement of said piston in said opposite direction, a seal mounted in said bore, a cylindrical displacement element mounted to slide rectilinearly in said seal and bore and having liquid-tight engagement with said seal to pre-load said body of liquid when said displacement element is adjusted inwardly of said bore, and a stop adjustably threaded in said housing and operatively connected to said displacement element to adjust the position of said displacement element in said bore, said displacement element having a smaller diameter than said piston.

4. A device of the character described comprising a housing having a chamber formed therein, a cylinder communicating with said chamber at one end thereof, and a cylindrical bore communicating with said chamber at the opposite end thereof, said chamber, cylinder, and bore being filled with a body of compressible liquid, a piston reciprocable in said cylinder and having liquid-tight engagement therewith, said piston being movable inwardly in said cylinder in response to compression forces to compress said body of liquid, said piston being moved outwardly to its original position when said liquid is permitted to expand upon relief of said compression forces, means limiting movement of said piston outwardly of said chamber, a seal within said bore, a cylindrical displacement element slidable rectilinearly in said bore for rectilinear adjustment therein to pre-load said body of liquid when said displacement element is adjusted inwardly of said bore, said displacement element having liquid-tight engagement with said seal, and a threaded plug adjustably threaded into said bore and engaging the outer end of said displacement element to adjust the position of said displacement element in said bore, said displacement element having a smaller diameter than said piston.

5. A device of the character described comprising a housing having a chamber therein and a bore communicating with said chamber, said chamber and bore being filled with a body of compressible liquid, a cylindrical piston movable in said chamber in response to compression forces to compress said body of liquid, said piston being returned to its original position as said body of liquid is permitted to expand upon relief of said compression forces, means including said piston for pre-loading said body of liquid, and supplemental means for further pre-loading said body of liquid comprising a cylindrical displacement element rectilinearly slidable in said bore for sliding rectilinear adjustment therein, and means adjustably threaded in said housing and engaging the outer end of said displacement element to adjust the position of said displacement element in said bore, the diameter of said displacement element being less than the diameter of said piston.

6. A device of the character described comprising a housing formed to provide a chamber filled with a body of compressible liquid and one end of which is formed with a threaded opening, said housing also having a bore through which the liquid may be introduced into said chamber, a cylinder screwed into said opening and open at one end into said chamber, said cylinder having an external threaded extension, a piston movable in said cylinder in response to compression forces to compress said body of liquid, said piston being returned to its original position as said body of liquid is permitted to expand upon relief of said compression forces, a cap-piece screwed on said threaded extension and operatively connected to said piston for adjusting the original position of said piston, said cap-piece and piston being adjustable relative to said threaded extension to pre-load said body of liquid, and displacement means adjustable in said bore for further preloading said body of liquid.

References Cited in the file of this patent

UNITED STATES PATENTS

| | | |
|---|---|---|
| 1,037,730 | Cowey | Sept. 3, 1912 |
| 1,142,825 | Lyons | June 15, 1915 |
| 2,554,807 | Bingham | May 29, 1951 |
| 2,563,194 | Shawbrook | Aug. 7, 1951 |
| 2,643,112 | Smith | June 23, 1953 |

FOREIGN PATENTS

| | | |
|---|---|---|
| 105,053 | Great Britain | Mar. 21, 1917 |
| 480,296 | Great Britain | Feb. 21, 1938 |
| 571,540 | Great Britain | Aug. 29, 1945 |